3,079,433
Patented Feb. 26, 1963

3,079,433
GAMMA-KETO AMIDES
Angelo John Speziale, Creve Coeur, Mo., assignor to Monsanto Chemical Company, St. Louis, Mo., a corporation of Delaware
No Drawing. Filed Mar. 20, 1961, Ser. No. 96,677
9 Claims. (Cl. 260—557)

This invention relates to new and useful methods of making gamma-keto amides, that is compounds characterized by the nucleus

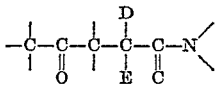

wherein D and E are hydrogen or aliphatic hydrocarbon radicals and wherein

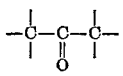

is the residue of a mono-carbonyl substituted acyclic or alicyclic hydrocarbon having the nucleus

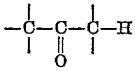

upon removal of the alpha-hydrogen substituent.

In accordance with this invention gamma-keto amides can be prepared in a convenient and efficient manner by bringing together and reacting an alpha-chloro fatty acid amide with a mono-carbonyl substituted acyclic or alicyclic hydrocarbon characterized by the nucleus

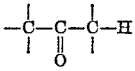

in the presence of an alkali metal hydride or alkali metal tert. butoxide or mixture thereof.

The alpha-chloro fatty acid amides of the process of this invention can be represented by the structure

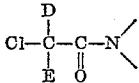

wherein D and E are hydrogen or aliphatic hydrocarbon radicals (in general the sum total of D and E as to carbon atom content will be in the range of 0 to 16, and preferably in the range of 0 to 5) and wherein —N< is a secondary amine residue, i.e.

(1) a saturated single ring heterocyclic amine residue of the structure

wherein A is —CH$_2$CH$_2$OCH$_2$CH$_2$—,

—CH$_2$CH$_2$SCH$_2$CH$_2$— or a divalent alkylene radical of from 4 to 10 carbon atoms having from 4 to 6 carbon atoms in a continuous chain between the valence bonds, or (2) a secondary amine residue of the structure

wherein M and G are like or unlike aliphatic hydrocarbyl radicals (i.e. alkyl, alkenyl, alkynyl), the sum total of M and G as to carbon atom content being in the range of 2 to 10. Such alpha-chloro fatty acid amide reactants include N,N-dimethyl alpha - chloroacetamide, N,N-dimethyl alpha-chloropropionamide, N,N-diethyl alpha-chloro isobutyramide, N,N-dimethyl alpha-chloro-lauric acid amide, N,N-diethyl alpha-chloro-stearic acid amide, N,N - diallyl alpha-chloroacetamide, N,N-(di - n-amyl) alpha-chloroacetamide, N-methyl-N-ethyl alpha-chloro-acetamide, N,N-diisoamyl alpha-chloroacetamide, N-methyl-N-propargyl alpha-chloroacetamide, N,N-diethyl alpha-chlorovaleramide, N,N-dibutyl alpha - chloroacetamide, N,N-dibut-2-enyl alpha-chloroacetamide, N-allyl N-ethyl alpha-chloro-acetamide, N-(chloroacetyl) morpholine, N-(chloroacetyl) pyrrolidine, N-(chloroacetyl) piperidine, N-(chloroacetyl) alphapipecoline, N-(chloroacetyl) betapipecoline, N-(chloroacetyl) gamma-pipecoline, N,N-di-ethyl alpha-chloropropionamide, N,N-diethyl alpha-chloroisobutyramide, N,N-diisopropyl alpha-chlorovaleramide, N,N-diethyl alpha-chlorocaproamide, N,N-diethyl alpha-chloro lauric acid amide, N,N-diethyl alpha-chloro palmitic acid amide, N,N-dimethyl alpha-chloro stearic acid amide, and the like.

The mono-carbonyl substituted hydrocarbon reactants of the process of this invention include acyclic ketones of the structure

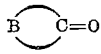

wherein B is a divalent alkylene radical of the empirical formula (CH$_2$)$_n$ wherein $n$ is a whole number from 3 to 9 and having from 3 to 6 carbon atoms in a continuous chain between the valence bonds and containing at least one hydrogen substituent on the alpha-carbon atom (e.g. cyclobutanone, cyclopentanone, cyclohexanone, cycloheptanone, cyclooctanone, 4 - methylcyclohexanone, 4-ethylcyclohexanone, 4-butylcyclohexanone, and the like) and the alicyclic ketones of the structure

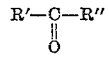

wherein R' and R" are like or unlike alkyl radicals (e.g. acetone, butanone, diethyl ketone, 3 - n - hexanone, 2-n-hexanone, 4-n-heptanone, diisopropyl ketone, 3 - n-octanone, diisobutyl ketone, 4-decanone, and the various isomeric forms thereof containing up to 10 carbon atoms) at least one of which R' and R" containing at least one hydrogen substituent in the carbon atoms attached to the carbonyl carbon atom. In general it is preferred that the ketone reactant be symmetrical and contain from 3 to 7 carbon atoms.

The alkali metal hydrides of the process of this invention include sodium hydride, potassium hydride, lithium hydride, and the like alkali metal hydrides of the structure MH wherein M is an alkali metal. The alkali metal tert. butoxides of the process of this invention include sodium tert. butoxide, potassium tert. butoxide, lithium tert. butoxide, and the like alkali metal tert. butoxides of the structure MOC(CH$_3$)$_3$ wherein M is an alkali metal.

In the process of this invention it is preferred to employ an inert organic solvent, e.g. benzene, toluene, xylene, heptane, hexane, octane, etc. While a wide range of reaction temperatures can be employed provided the system is fluid (i.e. a temperature above the freezing point of the system up to and including the boiling point of the system) it is preferred to employ a reaction temperature in the range of 0° C. to 75° C. In the process of this invention any pressure below or above atmospheric pressure can be used but in general atmospheric pressure will be used.

As illustrative of the process of this invention is the following:

*Example I*

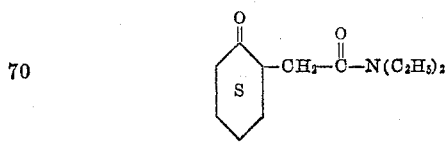

To a suitable reaction vessel equipped with a thermometer, agitator, off-gas tube, and reflux condenser is charged 125 cc. of hexane, 82 grams (substantially 0.55 mole) of N-N-diethyl alpha-chloroacetamide and 49 grams (substantially 0.5 mol) of cyclohexanone. While agitating the so-charged mass 24.6 grams (substantially 0.5 mol) of sodium hydride (50% by weight dispersion in mineral oil) in admixture with 100 cc. of hexane is added over a 45 minute period while maintaining the temperature at 0–5° C. Upon completion of the sodium hydride addition the reaction mass is heated to 50° C. over a two hour period. Then the mass is heated with agitation for 14 hours at 45–50° C. The reaction mass is then cooled to room temperature and filtered. The filtrate is then cautiously added to absolute ethyl alcohol in order to destroy any unreacted sodium hydride. This organic solution is then evaporated at about 85° C. The residue is then fractionally distilled yielding approximately 13.5 grams of unreacted cyclohexanone, approximately 20 grams of unreacted N,N-diethyl alpha-chloroacetamide, and approximately 60.2 grams of a fraction collected at 73–113° C. at 0.14 mm., $n_D^{25}$=1.4730–1.4800. The infrared spectra of this fraction disclosed that it contained 57% by weight 2-(diethylcarbamylmethyl) cyclohexanone and 33% by weight N,N-diethyl 3,3-pentamethylene glycidamide which analysis based on cyclohexanone consumed is equivalent to a weight yield of 37% gamma-keto amide and 21% epoxy amide.

The above described fraction upon redistilling yielded 23.5 grams of a fraction boiling at 109–112° C. at 0.27 mm., $n_D^{25}$=1.4820, and assaying 76% by weight 2-(diethylcarbamylmethyl) cyclohexanone. 3.7 grams of this latter fraction is mixed with 100 cc. of 2,4-dinitrophenylhydrazine-phosphoric acid reagent and heated on a steam bath for 30 minutes. The mass is cooled to room temperature, poured into 500 cc. of water, and the resulting mass extracted with chloroform. The residue obtained upon evaporation of the extract after recrystallization from ethyl acetate-hexane mixture gave (74.2% by weight yield) of the phenylhydrazone, orange needles melting at 163–164° C. This melting point was not depressed on mixing with an authentic sample of the 2,4-dinitrophenylhydrazone of 2-(diethylcarbamylmethyl) cyclohexanone.

*Example II*

Employing the procedure of Example I but adding the sodium hydride (50% dispersion in mineral oil) while maintaining the reaction mass at 50° C. yielded (according to infrared analysis) a product containing 42% by weight 2 - (diethylcarbamylmethyl) cyclohexanone and 17% by weight N,N-diethyl 3,3-pentamethylene glycidamine is obtained which analysis based on cyclohexanone consumed is equivalent to a weight yield of 21% gamma-keto amide and 9% epoxy amide. The gamma-keto amide is separated in a high state of purity by chromatograming on neutral alumina employing hexane as the eluent.

*Example III*

Employing the procedure of Example I but employing potassium tert.-butoxide (in the form of a tert.-butanol solution thereof) instead of sodium hydride the distilled fraction obtained analyzed 55% by weight 2-(diethylcarbamylmethyl) cyclohexanone.

*Example IV*

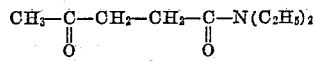

To a suitable reaction vessel equipped with a thermometer, agitator, off-gas tube, and reflux condenser is charged 17.4 grams of acetone, 45 grams of N,N-diethyl alpha-chloroacetamide and 125 cc. of hexane. While agitating the so-charged mass 14.4 grams of sodium hydride (50% by weight dispersion in mineral oil) in admixture with 75 cc. of hexane is added in the cold over a 60 minute period. The mass while agitating is heated at 25° C. for 19 hours. An additional 39.5 grams of acetone is then added and the mass heated at 25° C. for several hours. The mass is then filtered and the filtrate evaporated to remove the hexane. The residue is fractionally distilled and 41.2 grams of a fraction is collected at 72–85° C. (0.25 mm.), $n_D^{25}$ 1.4538–1.4570. Upon redistilling this fraction a fraction thereof collected at 70–79° C. (0.25 mm.) is found to have an $n_D^{25}$ of 1.4562 and analyzes according to infrared spectra 73% by weight N,N-diethyl levulinamide.

To illustrate the uniqueness of the process of this invention the process of Example I was carried out in the same manner but employing ethyl chloroacetate instead of N,N-diethyl alpha-chloroacetamide in the same molar amount. A 94% yield the epoxy ester ethyl 3,3-pentamethylene glycidate

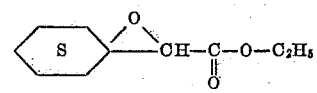

was obtained.

To further illustrate the uniqueness of the process of this invention when acetophenone was employed instead of cyclohexanone in Example I there was no evidence of gamma-keto amide formation.

In the process of this invention the molar ratio of ketone reactant to alpha-chloro fatty acid amide reactant will be about 1–4:1 and the molar ratio of alpha-chloro fatty acid amide reactant to alkali metal hydride or alkali metal tert. butoxide will be about 1:1.

Other gamma-keto amides which satisfy the structure

wherein D, E and —N< have the aforedescribed significance and wherein R is the mono-valent residue of a mono-carbonyl substituted acyclic or alicyclic hydrocarbon (which are described hereinbefore) characterized by the nucleus $$-\overset{|}{\underset{|}{C}}-\overset{}{\underset{\|}{C}}-\overset{|}{\underset{|}{CH}}-$$
$$O$$

upon removal of the hydrogen atom of said characterizing nucleus (i.e. the hydrogen substitutent of the carbon atom adjacent the carbonyl carbon atom), for example

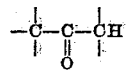

from acetone

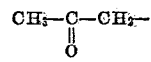

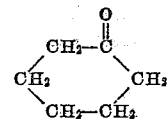

from cyclohexanone can be prepared in accordance with the process of this invention and include such gamma-keto amides as 2-(dimethylcarbamylmethyl)cyclohexanone
2-(diethylcarbamylmethyl)cyclopentanone
2-(ethylmethylcarbamylmethyl)cyclohexanone
2-(diisopropylcarbamylmethyl)cyclohexanone
2-(diallylcarbamylmethyl)cyclohexanone
2-(diamylcarbamylmethyl)cyclopentanone
2-(dimethylcarbamylmethyl)cycloheptanone
2-(diethylcarbamylmethyl)cycloheptanone
2-[1-(diethylcarbamyl)undecyl]cyclohexanone
2-[1-(diethylcarbamyl)propyl]cyclohexanone
2-[1-(diethylcarbamyl)isohexyl]cyclohexanone
2-[1-(diethylcarbamyl)heptadecyl]cyclohexanone
N-[(2-ketocyclohexyl)acetyl]morpholine
N-[(2-ketocyclohexyl)acetyl]piperidine N-[(2-ketocyclopentyl)acetyl]pyrrolidine
N-[alpha-(2-ketocyclohexyl)lauroyl]morpholine
N,N-dimethyl levulinamide
N,N-diisoamyl levulinamide
N,N-diallyl levulinamide
N,N-dipropyl levulinamide
N,N-dibutyl levulinamide
N-methyl N-ethyl levulinamide
N-(4-ketopentanoyl)morpholine
N-(4-ketopentanoyl)piperidine
N,N-dimethyl 3-methyl-4-ketohexanoylamide
N,N-diethyl 3-methyl-4-ketohexanoylamide
N,N-diethyl 4-ketohexanoylamide
N,N-diethyl 3-methyl-4-ketopentanoylamide
N,N-diethyl 3-propyl-4-ketooctanoylamide which gamma-keto amides are obtained from the appropriate ketone and the appropriate alpha-chloro fatty acid amide of a secondary amine.

The preferred gamma-keto amides obtained by the process of this invention are those of the structure

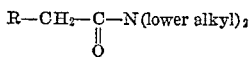

wherein R is

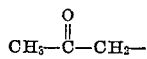

(i.e. 2-ketopropyl derived from acetone) or

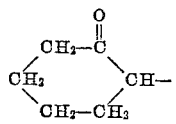

(i.e. 2-ketocyclohexyl derived from cyclohexanone) and wherein the expression "lower alkyl" means methyl, ethyl, propyl, butyl, amyl, and the various isomeric forms thereof containing up to 5 carbon atoms. The respective N-alkyl substituents can be like or unlike.

The gamma-keto amides prepared by the process of this invention are useful fungicides. For example, N,N-diethyl levulinamide and 2-(diethylcarbamylmethyl)cyclohexanone are wheat rust eradicants at concentrations of 0.25% by weight. The therapeutic effect of these materials was determined by spraying 6-day old seedlings of a rust-susceptible variety of wheat according to the procedure set forth in Example I of U.S. 2,875,124.

While the process of this invention has been described with respect to certain embodiments it is to be understood it is not so limited and it is to be understood that variations and modifications thereof obvious to those skilled in the art can be made without departing from the spirit and scope thereof.

This application is a continuation-in-part of U.S. Serial Number 42,988 filed July 15, 1960, and now abandoned.

What is claimed is:

1. The method of making gamma-keto amides which comprises reacting an alpha-chloro fatty acid amide of the structure

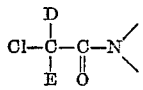

wherein D and E are selected from the group consisting of hydrogen and alkyl, and wherein —N< is a secondary amine residue selected from the group consisting of a (1) saturated single ring heterocyclic amine residue of the structure

wherein A is selected from the group consisting of

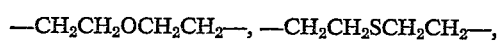

and alkylene of from 4 to 10 carbon atoms and having 4 to 6 carbon atoms in a continuous chain between the valence bonds, and a (2) secondary amine residue of the structure

wherein M and G are selected from the group consisting of alkyl and mono-unsaturated aliphatic hydrocarbyl selected from the group consisting of alkenyl and alkynyl, the sum total of M and G as to carbon atom content being in the range of 2 to 10, with a mono-carbonyl substituted hydrocarbon having the nucleus

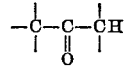

and being selected from the group consisting of acyclic and alicyclic ketones in the presence of an alkali metal compound selected from the group consisting of alkali metal hydrides, alkali metal tert. butoxides, and mixtures thereof.

2. The method of making gamma-keto amides which comprises reacting an alpha-chloro saturated fatty acid amide of a secondary di-loweralkyl amine with a mono-carbonyl substituted saturated acyclic hydrocarbon containing up to 10 carbon atoms and containing at least one alpha-hydrogen substituent in the presence of an alkali metal hydride.

3. The method of making gamma-keto amides which comprises reacting an alpha-chloro saturated fatty acid amide of a secondary di-loweralkyl amine with a mono-carbonyl substituted saturated alicyclic hydrocarbon containing up to 10 carbon atoms and containing at least one alpha-hydrogen substituent in the presence of an alkali metal hydride.

4. The method of making gamma-keto amides which comprises reacting an alpha-chloro acetic acid amide of a secondary di-loweralkyl amine with a symmetrical mono-carbonyl substituted saturated alicyclic hydrocarbon containing 3 to 7 carbon atoms and containing at least one alpha-hydrogen substituent in the presence of sodium hydride.

5. The method of making gamma-keto amides which comprises reacting an alpha-chloro acetic acid amide of a secondary di-loweralkyl amine with a symmetrical mono-carbonyl substituted saturated acyclic hydrocarbon containing 3 to 7 carbon atoms and containing at least one alpha-hydrogen substituent in the presence of sodium hydride.

6. The method of making gamma-keto acetamides of the structure

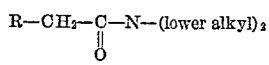

wherein R is selected from the group consisting of 2-ketopropyl and 2-ketocyclohexyl which comprises reacting an alpha-chloroacetamide of the structure

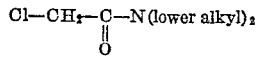

with a ketone selected from the group consisting of acetone and cyclohexanone in the presence of sodium hydride, the molar ratio of ketone to alpha-chloroacetamide to sodium hydride being about 1–4:1:1.

7. The method of making gamma-keto acetamides of the structure

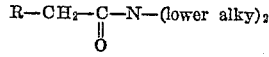

wherein R is selected from the group consisting of 2-ketopropyl and 2-ketocyclohexyl which comprises reacting an alpha-chloroacetamide of the structure

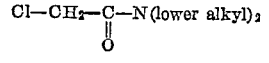

with a ketone selected from the group consisting of acetone and cyclohexanone in the presence of potassium tert.-butoxide, the molar ratio of ketone to alpha-chloroacetamide to potassium tert.-butoxide being about 1–4:1:1.

8. The method of making 2-(diethylcarbamylmethyl) cyclohexanone which comprises reacting cyclohexanone and N,N-diethyl alpha-chloroacetamide in the presence of potassium tert.-butoxide, the molar ratio of cyclohexanone to N,N-diethyl alpha-chloroacetamide to potassium tert.-butoxide being about 1–4:1:1.

9. The method of making N,N-diethyl levulinamide which comprises reacting acetone and N,N-diethyl alpha-chloroacetamide in the presence of potassium tert.-butoxide, the molar ratio of acetone to N,N-diethyl alpha-chloroacetamide to potassium tert.-butoxide being about 1–4:1:1.

No references cited.

UNITED STATES PATENT OFFICE
CERTIFICATE OF CORRECTION

Patent No. 3,079,433             February 26, 1963

Angelo John Speziale

It is hereby certified that error appears in the above numbered patent requiring correction and that the said Letters Patent should read as corrected below.

Column 4, lines 52 to 56, the formula should appear as shown below instead of as in the patent:

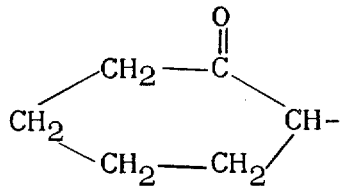

Signed and sealed this 22nd day of October 1963.

(SEAL)
Attest:

ERNEST W. SWIDER
Attesting Officer

EDWIN L. REYNOLDS
Acting Commissioner of Patents